Patented Apr. 8, 1952

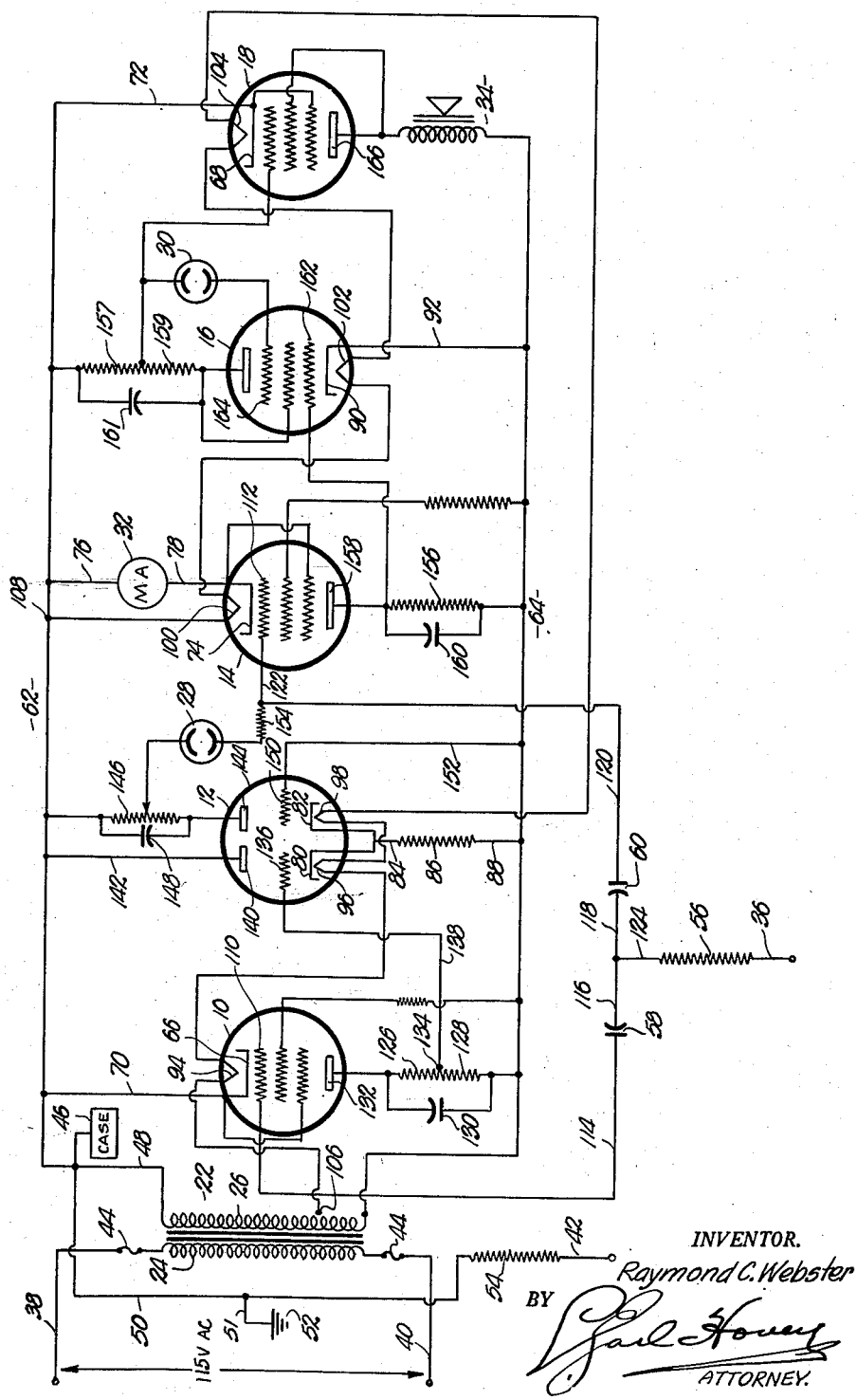

2,591,898

UNITED STATES PATENT OFFICE 2,591,898

STATIC ELECTRICITY INSTRUMENT HAVING AUDIBLE INDICATOR

Raymond C. Webster, Kansas City, Mo., assignor to W. E. Anderson, Inc., a corporation of Missouri Application August 23, 1948, Serial No. 45,738

6 Claims. (Cl. 177—311)

1

This invention relates to electrical instruments, and more particularly to an electric device capable, when placed in use, of positively detecting and indicating to the user thereof the presence of statical electricity in virtually any body. This is a continuation in part of my co-pending application Serial No. 7,212, filed February 9, 1948, now Patent No. 2,556,458, covering "Static Electricity Indicator."

It is a fundamental principle of electricity that, when two bodies come into frictional contact with each other, static electricity is created in each of said bodies and this phenomena is generally covered by the field of electro-statics. The presence of such static electricity, whether it consists of negative or positive charges, is oftentimes disadvantageous, and it is in many cases dangerous. The danger factor is more predominant in the field of medicine, particularly in zones of anesthesia where explosions are common because of a spark discharge of static electricity.

It is one of the objects of this invention, therefore, to provide an inexpensive and easily operated, relatively small, portable device capable of quickly detecting and indicating the presence of static electricity in any body, both visually and audibly, to the end that such electrical charges may be subsequently removed in any of the manners well known to those skilled in the art.

It is the primary object of this invention to provide an indicator for static electricity having both visual and audible indicating means as a part thereof and provided with a plurality of electron tubes including a tube for receiving negative static charges and one for receiving positive static charges so arranged and coupled relatively as to be extremely sensitive and uniformly so for both negative and positive static charges to be indicated.

The most important object of this invention is the provision of an instrument as above stated, wherein the aforesaid negative electron tube is provided with a floating grid and the positive indicating tube has a grid so coupled within the electric circuit as to essentially, also, be a floating grid.

A further object of this invention is to provide a highly negatively biased floating grid in the electron tube for indicating positive static charges through use of a neon tube.

A still further object of the present invention is to provide an indicator wherein the positive and the negative detector tubes are so directly coupled that the respective cathodes thereof are at virtually the same reference potential.

2

Another object of this invention is to provide an instrument capable of operation as above set forth without the use of a separate D. C. power supply.

A still further object of this invention is to provide an instrument having audible indicating means capable of utilizing the 60-cycle power available in the unit for producing the indicating sound.

Another important object of this invention is to provide a device of the aforementioned character operable upon the well known principle that positive or negative charges will induce voltage in a conductor when either of such charges or the conductor is moving and when the latter is in the field of such charges, and having means for visually and audibly indicating the positive or negative charges when the body containing the same comes into close proximity with the instrument.

Other objects of this invention will be made clear or become apparent during the course of the following specification, reference being had to the accompanying drawing, wherein the single figure is a schematic wiring diagram showing a static electricity instrument having an audible indicator, made in accordance with the present invention.

As above indicated, the presence of electrical charges taking the form of static electricity in various objects, including the human body, may in many instances be very detrimental to an attempted result, particularly in the field of medicine. It becomes desirous, therefore, to have means for quickly and easily indicating the presence of such static charges, to the end that steps may be taken to eliminate the same. Oftentimes, such electrical charges in an operating room present in the body of the surgeon himself, in the instruments he might use, in the body of his patient, and elsewhere, cause fatal explosions when created in the presence of highly combustible gases.

The case for housing virtually all of the electrical elements of the instrument about to be described has not been illustrated herein and, obviously, may be made in many different ways as needs might dictate. Such case should be explosionproof, be sealed tightly against opening except by the factory, and have sufficient warnings thereon as to tampering, attempted repair or alterations. Likewise, all connections, plugs and receptacles should be explosion-proof, all to the end of safety during use in operating rooms and the like. Also, a flame arrestor should be provided from porous metal or the like.

As shown in the drawing, the instrument includes a plurality of electron tubes 10, 12, 14, 16, and 18; a transformer 22, having a primary winding 24 and a secondary winding 26; neon lamps 28 and 30; a milliameter 32; a speaker 34; an antenna or probe 36; lead lines 38 and 40; and a grounding wire 42.

It is contemplated that the lead lines 38 and 40 extend from within the case for the instrument and have a conventional plug for connection to an outlet that joined to a source of alternating current, electrical energy. The speaker 34 within the case will communicate with the exterior thereof, and neon lamp 30, as well as meter 32, will all be visible to the user of the device. Probe 36 must extend from the case and be insulated therefrom, and grounding wire 42 should be disposed for connection with any object in the operating room or elsewhere that is to be grounded for reasons of safety.

Transformer 22 supplies the power for the circuit of the instrument and serves to isolate the same from the source of energy with which lead lines 38 and 40 are connected. Thus, such circuit can be safely grounded without, at the same time, grounding other electrical circuits, also, having connection with said source of energy. A saturable reactor type transformer would perhaps be more satisfactory, but would be impractical because of the power needed, thereby increasing the size beyond the desired limits in instruments of this character.

Each of the lead lines 38 and 40, which join directly with the primary 24 of transformer 22, has a fuze 44 interposed therein. The isolation transformer 22 is, therefore, fuzed in its primary 24 and any excessive current in either primary 24 or secondary 26 will cause one or both fuzes 44 to melt. Thus, any failure in the instrument of this invention will not interrupt other electrical appliances or instruments of the operating room or other establishment by melting of other safety fuzes in various electrical circuits having connection with the common source of energy.

The case for the instrument is indicated by the numeral 46 and connects, as does transformer 22 by wiring 48, with a wire 50 that is, in turn, grounded as at 52. Grounding wire or terminal 42, also, joins with wire 50 and serves to ground objects in the vicinity of the instrument through a resistance 54. This resistance 54 limits the rate of discharge to ground and helps to minimize the discharge spark created when a charged element happens to come into contact with the grounded object to which terminal 42 is attached.

It is contemplated that wire 51 constitute a third wire in the power cord receiving leads 38 and 40, the circuit demanding the grounding, not only of the "common" wire 48 from secondary 26, but of the case itself through wire 50. The hospital gas machines, operating tables, etc., can be grounded by means of terminal 42 through limiting resistance 54 that should be of about one (1) megohm.

The antenna terminal 36 is, also, isolated from the instrument circuit by a relatively high resistance 56, preferably of about 22 megohms, and by a pair of blocking condensers 58 and 60. These blocking condensers 58 and 60 are chosen to represent an infinite resistance to any direct current from the circuit and greater than 25 megohms to 60 cycle alternating current. Furthermore, terminal 36 is protected by a grounded metallic coupling and is well insulated, as above mentioned, by rubber and cotton braid wrappings or the like.

As will hereinafter appear, the speaker or earphone 34 serves as a signal alarm and should be of the high impedance type. In order to attain the necessary volume, it must operate at a much higher voltage than normally intended. But, its use will be intermittent and its construction will be of such as to be capable of withstanding the abuse.

The two main power lines leading from the secondary 26 of transformer 22 are broadly designated by the numerals 62 and 64, respectively, it being noted that line 62 joins with previously numbered wire 48. For simplicity and to eliminate the need of a D. C. power supply, the cathodes of the various tubes are connected alternately to the lines 62 and 64. In other words, cathodes 66 and 68 of these tubes 10 and 18, respectively, are connected to line 62 by wires 70 and 72, respectively, and cathode 74 of tube 14 joins with line 62 by wire 76, meter 32 and wire 78.

A pair of interconnected cathodes 80 and 82 for tube 12 connect with line 64 by wire 84, resistor 86, and a wire 88, and a cathode 90 for tube 16 has direct connection with line 64 by wire 92.

Heating filaments 94, 96, 98, 100, 102 and 104 are provided for cathodes 66, 80, 82, 74, 90 and 68, respectively, in the usual manner, which filaments are interconnected, as can easily be traced in the drawing, and joined to secondary 26 of transformer as at 106, as well as to line 62 at 108.

The tubes 10 and 14 constitute the negative and the positive detector tubes, respectively, of the circuit and operate essentially on the "floating grid" principle. The tube 10 should have an infinite resistance between its control grid 110 and its cathode 66, whereas tube 14 should have at least 1,000 megohms resistance between its control grid 112 and its cathode 74.

It would be desirable in this instrument for the control grid 112 of tube 14 to, also, be of the same floating type, but such provision is impossible because it is necessary to have a sufficiently high negative voltage between grid 112 and cathode 74 of tube 14 to prevent current flow through tube 14. The way in which such high negative voltage is attained will hereinafter be made clear. Grid 112 of tube 14 will, in effect, be a floating grid, along with grid 110 of tube 10, because of the above-mentioned extremely high resistance between grid 112 and cathode 74.

The control grids 110 and 112 of tubes 10 and 14, respectively, are connected through condensers 58 and 60 by wires 114, 116, 118, 120, and 122; and to terminal 36, through resistor 56, by wire 124.

Assuming lines 38 and 40 to be connected to a source of electrical energy and the instrument properly grounded, it is apparent that as soon as filament 94 becomes heated, tube 10 will pass maximum current and a D. C. voltage will result across resistors 126 and 128, because of the presence of a condenser 130. It is to be noted that plate 132 of tube 10 has connection with line 64 and that resistors 126 and 128 are interposed in such connection, with condenser 130 shunted thereacross.

Resistors 126 and 128 are connected directly at point 134 with grid 136 of tube 12, by line 138. A negative voltage induced into control grid 110 of tube 10 causes a decrease in the current flow through resistors 126 and 128 in turn causing the connecting point 134 to be more positive with respect to cathode 80 of tube 12.

Normally, the voltage across resistor 128 is negative and just sufficient to cause no flow of current from cathode 80 to plate 140 of tube 12. Plate 140 is joined directly to line 62 by wire 142 while plate 144 joins with line 62 through a variable resistance 146, across which is shunted a condenser 148.

Because of current flow through resistor 86, grid 150 of tube 12 (which is joined to line 64 by wire 152) is somewhat negative since there is normally a flow of current to plate 144 of tube 12. Since all current that flows to plates 140 and 144 must pass through resistor 86, the greater this current, the more positive that end of resistor 86 joining with wire 84 will become with respect to that end of resistor 86 joining with wire 88. This current connection is the same as that of grid 150 controlling the current to plate 144.

As grid 150 becomes more negative (or cathode 82 becomes more positive), less current will flow through resistance 146 and the negative voltage on grid 110 of tube 14 becomes less.

Voltage is applied to grid 112 of the positive detector tube 14 by way of variable resistance 146, through the neon lamp 28 and a resistor 154 (joining directly with wire 122). Lamp 28 acts as a very high resistance. (At least 1,000 megohms.) Enough negative voltage is applied to the grid 112 of tube 14 so that it is nearly cut off. About —35 volts will be necessary unless the positive side of the voltage is not grounded, thereby requiring a much higher voltage for cut off. Grid 112 will remain very sensitive, however, even though such high negative voltage is needed, since at about —30 volts, tube 14 will still pass full current. Full current to cut off occurs between —30 and —35 volts, with nearly all of the entire change coming with a 1-volt change in the grid voltage.

Since the resistance values of neon lamps vary, it will be necessary to select lamp 28. The higher grid voltage necessary to cut off, the higher resistance of lamp 29 and the more sensitive tube 14 will be.

High resistances other than lamp 28 might be chosen but would add greatly to the expense of the instrument. Also, the use of a lamp in this manner is advantageous because its resistance remains constant and is not subject to damage or change because of outside elements such as dirt and moisture.

Summarizing at this point, a negative charge induced at the probe 36 makes grid 110 of tube 10 more negative, diminishing the normal flow of current therethrough, since the normal flow of current from tube 10 causes a voltage drop across resistors 126 and 128. In other words, the drop in voltage across resistors 126 and 128 will be less with a negative voltage at probe 36 than during normal operation of the instrument.

As above stated, there is normally a negative voltage across resistor 146 and, therefore, between grid 112 and cathode 74 of tube 14 that is sufficient to stop entirely any current flow in tube 14.

When a positive charge is induced at probe 36, tube 14, which normally passes no current as above stated, is caused to pass current by rendering the voltage between cathode 74 and grid 112 thereof less negative. Accordingly, it is necessary to, also, make such voltage less negative when a negative charge is present at probe 36 by use of tubes 10 and 12.

This could be accomplished by connecting cathode 66 and plate 132 of tube 10 to lines 64 and 62, respectively, with resistors 126 and 128 and condenser 130 remaining in the plate circuit. With such reversal, wire 138 would still connect point 134 and join directly with grid 112 of tube 14.

Such arrangement, however, would not afford uniform sensitivity in measuring both positive and negative charges existing at probe 36. Thus, to attain such uniform sensitivity, the cathodes 66 and 74 of tubes 10 and 14, respectively, are commonly joined to the grounded line 62. With such common joinder, a direct coupling between tube 10 and tube 14 would fail to make the voltage between cathode 74 and grid 112 of tube 14 less negative, when a negative charge is induced at probe 36.

By insertion of tubes 12, tube 14 is controlled when a negative charge is induced at probe 36, in the following manner:

A negative charge at probe 36 causes grid 110 of tube 10 to become more negative with respect to its cathode 66 and point 134 becomes more positive with respect to line 64.

Normally, there is no current flow between cathode 80 and plate 140 of tube 12 because grid 136 is maintained at cut-off voltage. When point 134 becomes more positive, grid 136 becomes less negative, permitting current flow between cathode 80 and plate 140.

Normally, there is a current flow in tube 12 between cathode 82 and plate 144 and, when the current flow through resistor 86 increases, the flow of current from cathode 82 to plate 144 decreases. A decrease in voltage across resistor 146 is then present, causing a decrease in voltage between cathode 74 and grid 112 of tube 14. This makes grid 112 less negative.

When a positive voltage is induced at probe 36, such voltage will have no effect on the grid 110 of tube 10 as it is difficult to make the same more positive. Tube 14, however, will be made more negative and will begin to draw current. This current will pass through resistor 156, causing a voltage drop thereacross in the same manner as was caused by the negative voltage on grid 110 of tube 10, initially impressed on probe 36.

Thus, when the amount of voltage drop in resistor 146 becomes less, because of presence of negative charges at probe 36, the negative voltage impressed between grid 112 and cathode 74 of tube 14 is proportionately reduced. Such reduction in negative voltage causes current flow through tube 14 proportional to the amount of negative voltage impressed.

The meter 32 in the cathode circuit of tube 14 serves two purposes, i. e., it shows when tube 14 is at cut off, and it indicates the voltage induced at probe 36. Meter 32 normally registers zero because tube 14 draws no current. But, an indication will be made whenever either negative or positive charges are present at probe 36.

Current flow in tube 14 causes a voltage drop across a resistor 156 that is interposed between line 64 and plate 158 of tube 14, and a condenser 160 is connected across resistor 156. A voltage is thereby induced between cathode 90 and grid 162 of tube 16 that is equal to the voltage drop across resistor 156. Grid 162 is, therefore, made negative with respect to cathode 90 of tube 16.

Since there is normally no current flowing through tube 14, there is no voltage drop across resistor 156. The impressed voltage between grid 162 and cathode 90 of tube 16 is zero, and maximum current flows through tube 16 and resistors 157 and 159. A condenser 161 is shunted across resistors 157 and 159.

Tube 16 serves not only as an amplifier but supplies the negative bias voltage for the power output tube 18. Tube 16 is triode connected and its suppressor grid 164 serves as a power source for pilot lamp 30. Lamp 30 is normally energized but is de-energized when voltage is induced at probe 36.

Tube 18 is biased slightly beyond cut off and earphone 34 in the circuit of plate 166 of tube 18 is used to produce a signal that may be heard several feet whenever a voltage approaches probe wire 36. The signal will be a 60-cycle hum of half wave impulses delivered by tube 18.

It is seen that any moving electrical field or movement of probe 36 in a stationary field will cause a voltage to be induced at probe 36. Condensers 58 and 60 will be charged negative, whenever a negative charge is approaching probe 36 or a positive charge is moving away from probe 36. When a negative voltage moves away or a positive charge approaches probe 36, condensers 58 and 60 will be charged positively.

When condensers 58 and 60 are charged negatively, grids 110 and 112, of tubes 10 and 14, respectively, will be charged negatively, and conversely a positive charge in condensers 58 and 60 will charge grids 110 and 112 positively.

The grid voltage of tube 10 is maintained at contact potential voltage, since grid 110 is floating, and weak positive voltages induced at probe 36 will have little effect on it. Furthermore, since tube 14 is maintained at near cut off voltage, the negative voltage induced into its grid 112 has little effect on it. Thus, tubes 10 and 14 are sensitive only to their own respective voltages.

It is necessary that the leads to grids 110 and 112 be kept separate from the power lines 38 and 40, from ground terminal 42, and from lines 62 and 64. Sensitivity could be increased still further by separating condensers 58 and 60 and providing an antenna wire to each, with both antennas having a high resistance of about 22 megohms interposed therein.

It is to be noted that in order for antenna wire 36 to become "alive" (sparking voltage), it would be necessary to have a failure (short) in either tube 10, 14 or 16 and at the same time a failure of either condenser 58 or condenser 60, together with a failure in resistance 56 and in the insulation of antenna 36. Even under the severest conditions, failure of one of these elements will not cause failure in one of the others.

It is to be noted that the above-described circuit is operable without the necessity of a separate D. C. power supply for the plurality of electron tubes used. All grid control voltages are maintained as D. C. by use of the units having a resistor, together with a condenser shunted thereacross. Such resistors are designated by the numerals 126—128, 146, 156 and 157—159, together with their respective condensers 130, 148, 160 and 161, for tubes 12, 14, 16 and 18, respectively.

Having thus described my invention, what I claim as new and desire to secure by Letters Patent is:

1. An instrument for determining the existence of an electrostatic field comprising means for conducting electrical charges in said field; a pair of electrical, signal generating elements coupled with said conducting means, one of said elements being sensitive to positive charges only, the other element being sensitive to negative charges only; and means for amplifying the signals generated by said elements into an audio-frequency current.

2. An indicating instrument for determining the presence of either a positive or a negative charge on a body comprising a pick-up antenna adapted to be movably positioned adjacent to the body for induction of a charge thereon, a first three electrode tube having its control grid coupled with said antenna and being operative to pass current through its output circuit in response to a positive charge induced on the grid thereof, a second three electrode tube also having its control grid coupled with said antenna and being operative to pass current through its output circuit in response to a negative charge induced on the grid thereof, a pair of power supply conductors connected to said tubes, the plate element of each tube being connected to only one of said conductors, biasing means associated with the grid circuits of said tubes and a signal indicator in the output circuit of said first named tube and being operably responsive to current flow through said output circuit when either of said tubes operatively responds to positive or negative charges induced on a respective grid.

3. An instrument for determining the presence of an electrostatic field and of the type having a pick-up antenna adapted to be movably positioned in said field, said instrument comprising a positive charge detector tube and a negative charge detector tube, each tube having anode, cathode and grid elements, a pair of power supply conductors, the cathodes of both tubes being connected to one conductor and the plates of both tubes being connected to the other conductor, the antenna being connected to both of the control grids of the tubes, said positive charge detector tube normally having its grid biased negatively to tube cut-off condition, biasing means operably responsive to a reduced current flow in the negative charge detector tube for reducing the negative bias on the grid of the other tube to permit current to flow therethrough, an indicator operatively responsive to current flow through the anode-cathode circuit on said other tube, whereby a negative charge induced on said antenna and the grid of the negative charge detector tube will cause a reduced current therethrough, or a positive charge induced on the grid of the positive charge detector tube will reduce the negative bias thereon to permit an increase of circuit through its anode-cathode circuit.

4. An instrument for determining the presence of an electrostatic field and of the type having a pick-up antenna adapted to be movably positioned in said field, said device comprising a first tube for detecting a positive charge and having an anode-cathode circuit and a control grid, said grid being connected to the antenna, a second tube having separate pairs of triode elements therein, each triode comprising anode, cathode and grid elements, the plate of one triode being connected through a first biasing resistance to the grid of said first tube, said latter grid being connected also to the antenna, a third negative charge detector tube having anode, cathode and grid elements, a second resistance connected at one point to the plate of said third tube, the two grids of the second tube being connected to other points on said resistance whereby variation in current flow through the resistance is operative to bias the last named grids, an indicator operatively responsive to current flow in the anode-cathode circuit of said first named tube, said resistances being operative normally to block current flow through said first named tube and one triode of the second tube but to permit current flow through the negative charge detector tube and the other triode and, whereby an induced negative charge on said antenna and said third tube grid will reduce current flow therethrough, and through said second resistance and said other triode and its connected resistance, thereby to reduce the negative bias on said first tube grid to permit current flow in its anode-cathode circuit to energize the indicator.

5. A thermionic device for indicating both a positive or a negative charged condition of a body comprising a first or positive charge detector tube, a second or negative charge detector tube and an intermediate bias control tube, the first and second tubes having anode, cathode and grid elements, said intermediate tube having a first and a second triode element unit therein, each unit comprising anode, cathode and grid elements, an A. C. transformer having output leads connected to the anode and cathode elements of each tube, the cathodes of the first and the second tubes being connected to one lead and the cathodes of the intermediate tube being connected to the other lead, a first biasing resistance connected at one end point to the anode of said second tube, the two grids of the intermediate tube being connected to other points on said resistance, an electrostatic field pick-up antenna connected to the grids of the first and second tubes, a second biasing resistance connected in circuit between the plate of one triode and the grid of the first tube, said resistances being operative normally when no charge is being induced on the antenna to block current flow through said first tube and through the anode-cathode circuit of the triode associated with the second resistance, but to permit current flow through said second tube and the other triode circuit, the current flow through both resistances and associated tubes being varied when either a positive or a negative is induced on the antenna in a manner to reduce the negative bias on said first tube to permit current flow through its anode-cathode circuit, and an indicator operably responsive to current flow through said first tube.

6. A thermionic device for indicating both a positive and a negative charged condition of a body comprising a first tube for detecting a positive charge and a second tube for detecting a negative charge, each tube having anode, cathode and grid elements, power supply conductors for energizing said tubes, the cathodes of both tubes being connected to one conductor and the anodes of both tubes being connected to the other conductor, a pick-up antenna adapted to be positioned within the field adjacent to the body and being connected to the grid of each tube, an indicator operatively responsive to flow of current in the anode-cathode circuit of said first tube, a biasing resistance connected to the anode of said second tube and being coupled in circuit with the grid of the first tube, means operably responsive to a decreased current flow in the anode-cathode circuit of the second tube and in said resistance for reducing the negative bias on the grid of the first tube and to increase the current flow therethrough, the connection of said antenna to said grids being effective to permit a negative charge thereon to increase the negative bias on the grid of the second tube and cause a decrease of current therethrough or to permit a positive charge thereon to also reduce the negative bias on the first tube and to increase the current flow through its anode-cathode circuit to operate said indicator.

RAYMOND C. WEBSTER.

REFERENCES CITED

The following references are of record in the file of this patent:

UNITED STATES PATENTS

| Number | Name | Date |
|---|---|---|
| 1,514,753 | Wold | Nov. 11, 1924 |
| 2,125,050 | Josephs, Jr., et al. | July 26, 1938 |
| 2,356,733 | Banker | Aug. 29, 1944 |
| 2,403,955 | Schlesinger | July 16, 1946 |
| 2,434,822 | Van Beuren et al. | Jan. 20, 1948 |
| 2,475,356 | Meschter | July 5, 1949 |